United States Patent Office 3,501,520
Patented Mar. 17, 1970

3,501,520
THIO AND DITHIODICARBOXYLIC ACID THIOETHER ESTERS
Silvio L. Giolito, Whitestone, N.Y., assignor to Stauffer Chemical Company, New York, N.Y., a corporation of Delaware
No Drawing. Original application Oct. 23, 1965, Ser. No. 504,189, now Patent No. 3,398,116, dated Aug. 20, 1968. Divided and this application Mar. 21, 1968, Ser. No. 734,508
Int. Cl. C07c 153/07, 149/20; C08f 45/58
U.S. Cl. 260—481    9 Claims

ABSTRACT OF THE DISCLOSURE

Thiodicarboxylic acid thioether esters of the formula:

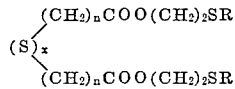

wherein R is an alkyl of from 8 to 18 carbon atoms, $x$ is an integer of from 1 to 2, and $n$ is an integer from 1 to 3. The above thioether esters are useful as antioxidants for poly-alpha-olefins.

---

This application is a division of U.S. Ser. No. 504,189, filed Oct. 23, 1965, now U.S. Patent 3,398,116.

This invention relates to stabilized poly-alpha-olefin compositions and novel compounds which may be used in said compositions. More particularly, the invention is concerned with stabilizing poly-alpha-olefins against oxidative degradation by means of synergized phenolic antioxidants.

It is well known that poly-alpha-olefins are peculiarly susceptible to oxidative degradation when subjected to moderately elevated temperatures in the presence of air. Since these conditions are frequently encountered during the fabrication of plastic articles, e.g. molding, casting, extruding and similar operations, the successful commercial exploitation of a synthetic resin usually requires the development of suitable stabilizers. Poly-alpha-olefin resins especially sensitive to oxidation are the so-called stereoregular polyolefins which are obtained by the polymerization of alpha-olefins in the presence of a type of catalyst system discovered at the Max Planck Institute. These catalysts which are described in the literature, e.g. Belgium Patent 538,782 and Scientific American, September 1957, pages 98 et seq., are solid, insoluble reaction products formed by partially reducing a reducible heavy transition compound of a Group IV–B, V–B, VI–B or VIII Metal, e.g. titanium and vanadium halides such as the chlorides, with a reducing Group I–B metal containing material such as an organometallic compound of an alkali, alkaline earth, rare earth metal or zinc. For a more detailed description of these materials, reference is made to the aforecited literature references.

A stereoregular or crystalline polymer of the polyolefin type which has recently gained favor and acceptance is crystalline polypropylene. Because of its superior physical properties, this polymer has been extensively developed and is now available on the commercial market in a variety of forms including castings, films, fibers and the like. Highly crystalline polypropylene, or as it is more familiarly known isotactic polypropylene, exhibits melt indices when measured at 190° C. ranging from about 0.01 to 50 and it is this physical characteristic which renders these polymers especially useful in the production of synthetic fibers and films. Other desirable and beneficial physical properties of this resin include exceptional transparency, high mechanical strength and resistance to chemicals and salts.

Despite the excellent physical and chemical properties of crystalline polypropylene, it is notoriously sensitive to oxidative degradation at even moderately elevated temperatures. In this respect, it is inferior to polyethylene and some of the other poly-alpha-olefins. The rapidity with which isotactic polypropylene undergoes air oxidation is strikingly demonstrated when heat-spun polypropylene fibers are placed in a circulating air oven at 125° C. At the end of 50 hours, the fibers have lost approximately 50% of their strength; at the end of 100 hours they are degraded to a powdery residue. On the other hand, polyethylene remains essentially unaffected under identical conditions.

There have been various proposals for improving the thermal properties of poly-alpha-olefins. Generally speaking, these involve incorporating certain additives in the polymer in order to inhibit its susceptibility to oxidation. A class of compounds commonly used for the aforesaid purpose are phenolic derivatives and in this connection the thio and alkylene bis-phenols afford a high degree of protective action. Such compound possesses powerful antioxidant activity and it is apparently this property which is responsible for their stabilizing effect on poly-alpha-olefins.

With a view to achieving even higher stabilization of poly-alpha-olefins, it has now been discovered that the normal protective action of phenolic antioxidants is enhanced to an unexpected degree by using them in combination with an ancillary substance. More specifically, I have found that the antioxidant activity of phenolic antioxidants in the poly-alpha-olefin system rises to an unexpectedly high level when used in association with certain novel thiodicarboxylic esters of the formula

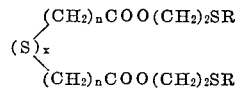

wherein R is alkyl of from 8 to 18 carbon atoms, $x$ is an integer of from 1 to 2 and $n$ is an integer of from 1 to 3. As can be seen from the formula, the compounds embraced thereby contain a multiplicity of thioether functions. It is believed that this structural characteristic is, in some manner as yet unexplained, responsible for amplifying the antioxidant power of phenolic sulfides. Apparently a synergistic mechanism is involved since a mixture of the phenolic sulfide and thiodicarboxylic ester exhibits greater activity than a like quantity of either component alone.

The novel thiodicarboxylic esters of the invention are prepared by esterifying, in the presence of an acid catalyst and in a molar ratio of 1 to 2, a thiodicarboxylic acid with a 2-alkylmercaptoethanol as depicted in the following equation:

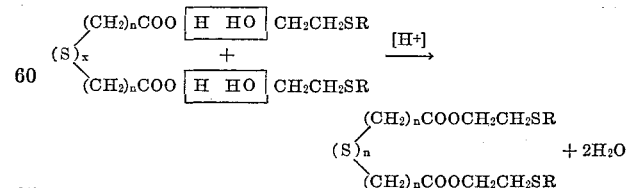

In carrying out the esterification generally excellent results are achieved by refluxing the thiodicarboxylic acid, 2-alkylmercaptoethanol and acid catalyst in the presence of an inert water immiscible solvent while removing the water of reaction by azeotropic distillation. Preferred inert solvents are the normally liquid aromatic hydrocarbons such as benzene, toluene, xylene and the like. Suitable catalysts are the mineral acids, e.g. sulfuric acid, phosphoric acid, etc., sulfonic acids, e.g. benzenesulfonic, toluenesulfonic acid, methanesulfonic acid, etc.

The thiodicarboxylic acids ($x=1$) used in preparing the compounds herein are known materials obtained by condensing a halocarboxylic acid with sodium sulfide or reacting acrylonitrile with hydrogen sulfide followed by hydrolysis. The dithiodicarboxylic acids ($x=2$) are obtained by the oxidative coupling of a mercaptocarboxylic acid. 2-alkylmercaptoethanols are likewise known chemical entities formed by condensing ethylene oxide with an alkyl mercaptan.

The following non-limiting examples illustrate the compounds of the present invention:

Example 1

A-1389

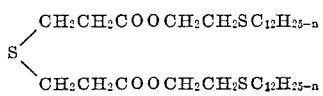

2-n-dodecylthioethyl 3,3'-thiodipropionate 49.0 g. (0.2 mole) of n-dodecylthioethanol and 15.0 g. (0.1 mole) of thiodiglycolic acid were dissolved in 250 ml. of benzene containing 1.0 g. of toluenesulfonic acid and the resulting mixture refluxed while azeotropically removing the water of reaction by means of a Dean Stark apparatus. After all the water had been removed the contents of the flask were cooled and washed once with 200 ml. of water, once with a 3% sodium bicarbonate solution and once with 200 ml. of water. The organic layer was subjected to distillation under reduced pressure to remove benzene and other volatile components. There remained a white crystalline residue melting at 39° C. Instrumental and chemical analysis of the product established its structure to be as above shown.

Using the procedure of Example 1 the following compounds were prepared:

Example 2

A-1461

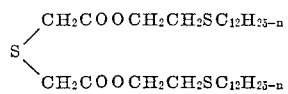

2-n-dodecylthioethyl 2,2'-thiodiacetate

Example 3

A-1388

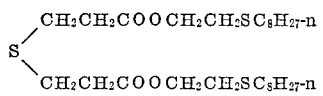

2-n-octylthioethyl 3,3'-thiodipropionate

Example 4

A-1509

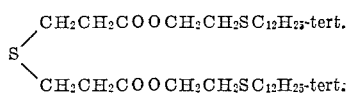

2-tert. dodecylthioethyl 3,3'-thiodipropionate

Example 5

A-1504

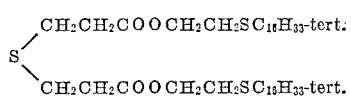

2-tert. hexadecylthioethyl 3,3'-thiodipropionate

Example 6

A-1512

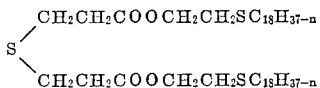

2-n-octadecylthioethyl 3,3'-thiodipropionate 60° C. MP.

Example 7

A-1524

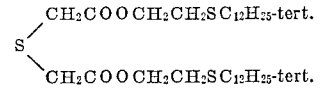

2-tert. dodecylthioethyl 2,2'-thiodiacetate

Example 8

A-1550

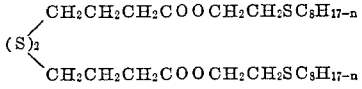

2-n-octylthioethyl 4,4'-dithiodibutyrate 23 g. (0.1 mole) of 4,4'-dithiobutyric acid and 37.2 g. (0.2 mole) of n-octylthioethanol was dissolved in 250 ml. of benzene containing 1.0 g. of toluenesulfonic acid. The resulting mixture was refluxed until all of the water of reaction had distilled off. A Dean Stark apparatus was used to effect removal and collection of the water. The contents of the flask were then washed once with 200 ml. of water, once with 3% sodium bicarbonate and again with 200 ml. of water. The organic layer was subjected to vacuum distillation to remove benzene and volatile materials. The residual yellow oil was identified by means of instrumental and chemical analysis as having the above depicted structure. The $N_D^{25}$ was 1.5002.

The phenolic antioxidants, suitable for practicing the invention, are preferably alkylene phenols and phenolic sulfides. They comprise a known class of compounds the description and preparation of which can be found in the patent and chemical literature.

The alkylene phenols are commonly prepared by reacting an aldehyde, ketone, a benzyl halide or alcohol with phenol or substituted phenol in accordance with well known procedures. The structure of the resulting products can be illustrated as follows:

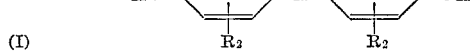

(I)

wherein $R_1$ and $R_2$ represent hydrogen or alkyl radicals of from 1 to 18 carbon atoms and A can be

wherein $R_3$ and $R_4$ are hydrogen, alkyl radicals of from 1 to 8 carbon atoms or

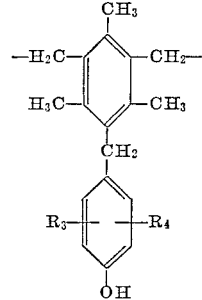

For a more detailed description of the compounds subsumed by Formula I, reference is made to U.S. Patents 3,026,297, 3,055,863, 3,068,198, 2,966,476 2,947,724, 3,026,264.

The phenolic sulfides are likewise known materials which are referenced extensively in the technical publications including both chemical patents and journals. The general configuration of this class of phenolic antioxidants can be depicted by the following formula:

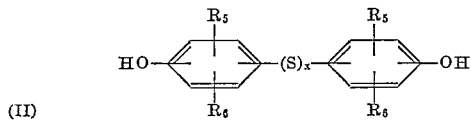

(II)

wherein $R_5$ and $R_6$ represent hydrogen, alkyl of from 1 to 18 carbon atoms, benzyl and lower chain alkylated benzyl, and $x$ is an integer of from 1 to 3. These entities are obtained by reacting sulfur monochloride ($S_2Cl_2$) or sulfur dichloride ($SCl_2$) with the requisite phenol and isolating the resulting phenolic sulfide by the usual means such as crystallization, distillation or the like. For a fuller description and preparation of phenolic sulfides, reference is made to U.S. Patents 3,173,890 and 3,060,121 as well as the general technical and chemical literature.

The combination of the herein described thioether diesters of thiodicarboxylic acids such as thiodiglycolic acid, 3,3'-thiodipropionic acid, thiodibutyric acid and the like with an alkylene phenol or phenolic sulfide or disulfide can be used to stabilize a wide selection of solid poly-alpha - olefin compositions against thermal degradation resulting from exposure to elevated temperatures. Any of the normally solid polymers of an alpha-monoolefinic aliphatic hydrocarbon containing 2 to 10 carbon atoms can be stabilized in accordance with the invention. Although the preferred polymer is isotactic polypropylene, other poly-alpha-olefins which can be stabilized by the antioxidant combinations of the invention include poly (3 - methylbutene - 1), poly(4 - methylpentene - 1), poly (pentene - 1), poly(3,3 - dimethylbutene - 1), poly(4,4-dimethylbutene - 1), poly(octene - 1), poly(decene - 1) and the like. The so-called "low density" and "high density" or high crystallinity poly-alpha-olefin compositions can be stabilized by means of the compositions herein set forth. The stabilizer compositions of the invention are particularly useful for protecting solid resinous poly-alpha-olefins whose average molecular weights are from about 15,000 to about 20,000, although the protective action afforded extends to include the so-called poly-alpha-olefin waxes having lower molecular weights in the vicinity of from about 3,000 to 12,000.

The amount of the combination of the thioether diester of 3,3' - thiodicarboxylic acid and alkylene phenol or phenolic sulfide is not especially critical and wide variations of these materials can be employed to achieve excellent stabilization of poly-alpha-olefins. Concentrations of about 0.001% to 10% and generally about 0.001% to 5% for each component of the stabilizer combination are used, although the desired range lies within 0.01% to 3.0%. In all instances, a concentration of the additive is based on the weight of the poly-alpha-olefin.

The stabilizer combinations of the invention can be incorporated or blended into poly-alpha-olefin compositions by the usual methods which are commonly employed for mixing such materials into resins and plastics. Typically, the methods include milling on heated rolls, deposition from solvents and dry blending. The stabilizers of the invention can be incorporated either separately or together into the poly-alpha-olefin compositions.

The poly-alpha-olefins stabilized in accordance with the invention have an extended life expectancy and can be used more effectively than the unstabilized resins and for a wider diversity of uses and purposes. Poly-alpha-olefins stabilized as described herein can be cast, extruded, rolled or molded into sheets, rods, tubes, pipes, filaments and other shaped articles including such widely used configurations as films of the polymers having a thickness of from about 0.5 to 100 mils. The compositions can be used for coating paper, wire, metal foil fiberglass fabrics, synthetic and natural textiles or fabrics or other such materials requiring protective coating.

The following examples illustrate the procedure for preparing stabilized crystalline poly-alpha-olefin compositions of the invention, although the inclusion of such examples is not to be construed as limiting or otherwise imposing any restriction on the invention and it is to be understood that variations in practicing the invention without departing from the scope or spirit thereof will be apparent those skilled in the art.

Procedure 10 g. of powdered polypropylene resin containing 0.2% of an antioxidant of the type described herein and 0.2% of the thioether diester of 3,3'-thiodipropionic acid was placed on the center of a 6" x 6" stainless steel plate. A similar steel plate was then placed on top of the powder while exerting a slight downward pressure. The assembly was placed in the center of the lower platen of a hydraulic press which was previously heated to 350° F. The lower platen of the press was raised until both platens contacted the upper and lower 6" x 6" stainless steel plate. The powder sample was allowed to warm up for about four minutes or until fusion of the resin had occurred. As the pile of resin began to melt, the lower platen of the press was raised slightly to ensure that both platens contacted the steel plates enclosing the sample. After about four minutes or when the fusion of the resin occurred, the lower platen was raised to a one-ton load and so maintained for two minutes. The drain valve was then opened to vent off steam after which cold water was admitted to cool the platens and plates to 50° F. The molded circular sheet of resin was approximately 25–30 mils thick.

1" discs were cut from the molded sheet and placed in petri dishes and then exposed to a temperature of 150 °C. in a forced draft oven. The samples were examined several hours later and checked off for signs of discoloration, crystallization, opacity, scorching of the edges, complete embrittlement and cracking. After removal from the oven, the samples were then compared with control samples containing no antioxidant combination. The results obtained by the use of the various stabilizer compositions of the invention are summarized in the examples listed in the table.

| Example | Antioxidant | Synergist 0.2% | Hours to Embrittlement |
|---|---|---|---|
| 9 | Topanol CA | A-1388 | 830 |
| 10 | do | A-1389 | 1,674 |
| 11 | do | A-1461 | 1,180 |
| 12 | do | A-1509 | 740 |
| 13 | do | A-1512 | 1,961 |
| 14 | A-922 | A-1388 | 750 |
| 15 | A-922 | A-1389 | 1,007 |
| 16 | A-922 | A-1461 | 1,188 |
| 17 | A-922 | A-1509 | 880 |
| 18 | A-922 | A-1512 | 1,630 |
| 19 | RA-565 | A-1388 | 663 |
| 20 | RA-565 | A-1389 | 885 |
| 21 | Ionox 330 | A-1388 | 1,668 |
| 22 | do | A-1461 | 1,730 |
| 23 | do | A-1509 | 1,260 |
| 24 | do | A-1512 | 1,728 |
| 25 | RA-1093 | A-1389 | 1,541 |
| 26 | RA-1093 | A-1461 | 1,190 |
| 27 | RA-1093 | A-1509 | 1,229 |
| 28 | RA-1093 | A-1512 | 1,670 |
| 29 | Santowhite P | A-1388 | 230 |
| 30 | do | A-1389 | 590 |
| 31 | do | A-1461 | 290 |
| 32 | do | A-1504 | 163 |
| 33 | do | A-1509 | 278 |
| 34 | do | A-1512 | 323 |
| 35 | do | A-1524 | 164 |
| 36 | do | A-1550 | 492 |

The identity of the antioxidant and synergist used in the examples are set out below:

A-1388
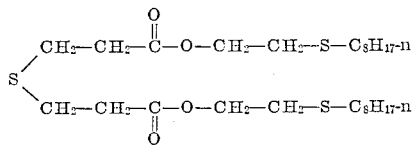

A-1389
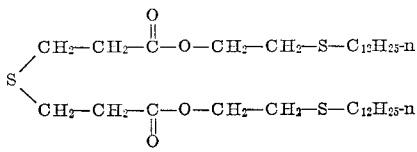

A-1461
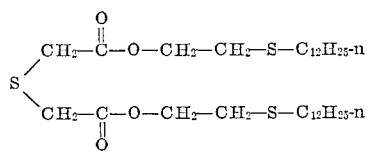

A-1504
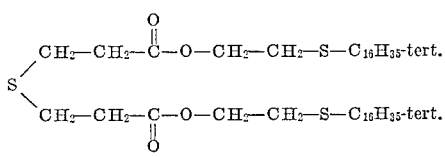

A-1509
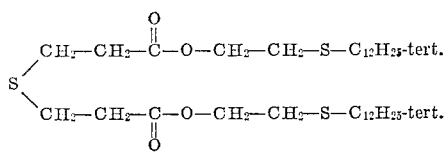

A-1512
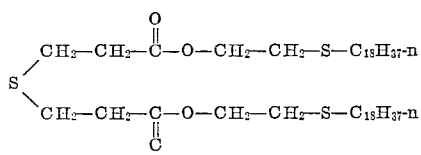

A-1524
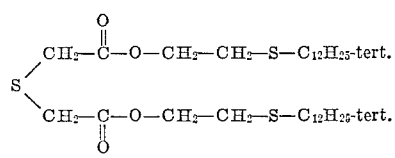

A-1550
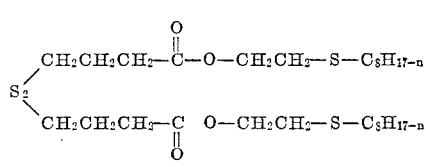

A-922
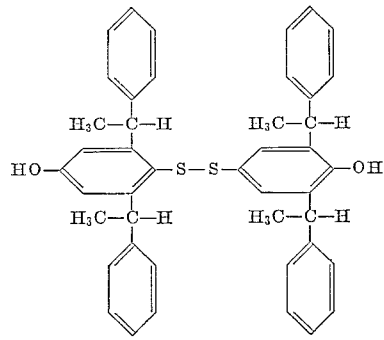

U.S. Patent 3,060,121

Topanol CA: Trademark for 3:1 condensation of 3-methyl-6-tert.-butylphenol and acrolein.

Ionox 330: Trademark for

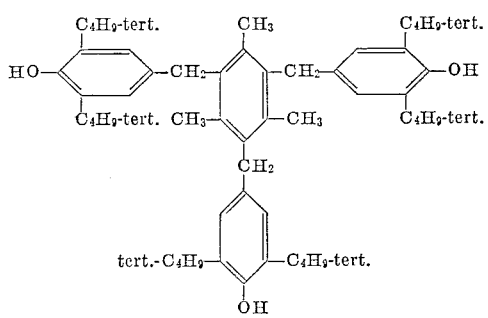

Santowhite P; Trademark for

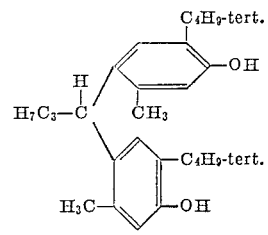

The mixture of powdered polypropylene resin, 3,3'-thiodipropionic acid thiodiester and antioxidant as used in the above described procedure was prepared by intimately mingling the polypropylene resin and antioxidant composition in a Waring Blendor until a homogenous mixture of the components was obtained. The polypropylene resin was an unstabilized, general purpose, high molecular weight polypropylene resin of the isotactic or crystalline type. Typically, such an isotactic resin as above described has a melt index of 4 at 230° C. and a specific gravity of 0.905.

I claim:
1. A thiodicarboxylic acid thio ether ester having the formula

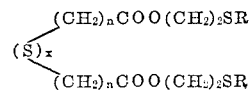

wherein R is alkyl of from 8 to 18 carbon atoms, $x$ is an integer of from 1 to 2, and $n$ is an integer of from 1 to 3.

2. 2-n-dodecylthioethyl 3,3'-thiodipropionate.
3. 2-n-dodecylthioethyl 2,2'-thiodiacetate.
4. 2-n-octylthioethyl 3,3'-thiodipropionate.
5. 2-tert. dodecylthioethyl 3,3'-thiodipropionate.
6. 2-tert. hexadecylthioethyl 3,3'-thiodipropionate.
7. 2-n-octadecylthioethyl 3,3'-thiodipropionate.
8. 2-tert. dodecylthioethyl 2,2'-thiodiacetate.
9. 2-n-octylthioethyl 4,4'-dithiodibutyrate.

References Cited

UNITED STATES PATENTS 3,398,116  8/1968  Giolito _____ 260—45.85

LORRAINE A. WEINBERGER, Primary Examiner

EDWARD J. GLEIMAN, Assistant Examiner

U.S. Cl. X.R.

252—406; 260—45.85, 45.95, 48